US009695714B2

United States Patent
Olsen et al.

(10) Patent No.: US 9,695,714 B2
(45) Date of Patent: Jul. 4, 2017

(54) LOW LOSS BEARING DRAIN

(71) Applicant: United Technologies Corporation, Hartford, CT (US)

(72) Inventors: David R. Olsen, Wellington, FL (US); Frederic G. Miner, Jupiter, FL (US); Paul H. Dolman, Simsbury, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/785,103

(22) PCT Filed: Apr. 21, 2014

(86) PCT No.: PCT/US2014/034845
§ 371 (c)(1),
(2) Date: Oct. 16, 2015

(87) PCT Pub. No.: WO2014/176180
PCT Pub. Date: Oct. 30, 2014

(65) Prior Publication Data
US 2016/0090871 A1 Mar. 31, 2016

Related U.S. Application Data

(60) Provisional application No. 61/814,711, filed on Apr. 22, 2013.

(51) Int. Cl.
*F01D 25/16* (2006.01)
*F01D 25/32* (2006.01)
(Continued)

(52) U.S. Cl.
CPC ............... *F01D 25/32* (2013.01); *F01D 5/02* (2013.01); *F01D 5/12* (2013.01); *F01D 25/16* (2013.01);
(Continued)

(58) Field of Classification Search
CPC ........ F01D 25/32; F01D 25/162; F01D 25/18; F01D 25/20; F01D 25/183; F01D 5/12;
(Continued)

(56) References Cited

U.S. PATENT DOCUMENTS 2,928,649 A * 3/1960 Lombard ................ E05B 27/00
29/889.21
3,778,194 A * 12/1973 Miller ................... F01D 25/186
415/175
(Continued)

FOREIGN PATENT DOCUMENTS

EP 1923540 A2 5/2008
WO WO -2011/058627 A1 * 5/2011 ............. F01D 25/16

OTHER PUBLICATIONS

International Search Report and Written Opinion from PCT Application Serial No. PCT/US2014/034845, dated Aug. 22, 2014, 9 pages.
(Continued)

*Primary Examiner* — Christopher Verdier
(74) *Attorney, Agent, or Firm* — Kinney & Lange, P.A.

(57) ABSTRACT

A turbine module comprises a turbine shaft, a rotor assembly secured to the shaft, a bearing assembly rotatably supporting the turbine shaft, and a bearing housing containing the bearing assembly. The bearing housing includes a gutter at least partially circumscribing the bearing assembly, and a drain disposed proximate a base of the gutter. The gutter includes a first sloped floor portion circumferentially adjacent to the drain.

16 Claims, 5 Drawing Sheets

(51) Int. Cl.
    *F01D 25/18*   (2006.01)
    *F02C 7/06*    (2006.01)
    *F01D 5/02*    (2006.01)
    *F01D 5/12*    (2006.01)
    *F16C 33/66*   (2006.01)
(52) U.S. Cl.
    CPC ............ *F01D 25/162* (2013.01); *F01D 25/18* (2013.01); *F01D 25/183* (2013.01); *F02C 7/06* (2013.01); *F16C 33/6685* (2013.01); *F05D 2220/30* (2013.01); *F05D 2240/54* (2013.01); *F05D 2240/60* (2013.01); *F05D 2260/602* (2013.01); *F05D 2260/98* (2013.01); *F16C 33/6637* (2013.01); *F16C 33/6659* (2013.01); *F16C 2360/23* (2013.01)
(58) Field of Classification Search
    CPC ... F01D 5/02; F01D 25/16; F02C 7/06; F05D 2240/60; F05D 2240/54; F05D 2220/30; F05D 2220/32; F05D 2260/98; F05D 2260/602; F16C 33/6637; F16C 33/6659; F16C 33/6685

USPC .......... 415/111, 112, 113, 175, 229, 230, 231
See application file for complete search history.

(56) References Cited

U.S. PATENT DOCUMENTS

| | | | |
|---|---|---|---|
| 4,086,759 A | | 5/1978 | Karstensen et al. |
| 4,789,253 A | * | 12/1988 | Perego ................. F01D 25/164 384/517 |
| 5,733,048 A | * | 3/1998 | El-Ibiary ................. F16N 7/40 384/399 |
| 2003/0059295 A1 | | 3/2003 | Olsen |
| 2007/0157596 A1 | | 7/2007 | Moniz |
| 2010/0037855 A1 | * | 2/2010 | French .................... F01D 25/16 123/323 |
| 2010/0196148 A1 | | 8/2010 | Gee et al. |
| 2012/0288358 A1 | | 11/2012 | Balk |

OTHER PUBLICATIONS

Extended European Search Report for European Patent Application No. 14788191.6, dated Jun. 1, 2016, 7 pages.

\* cited by examiner

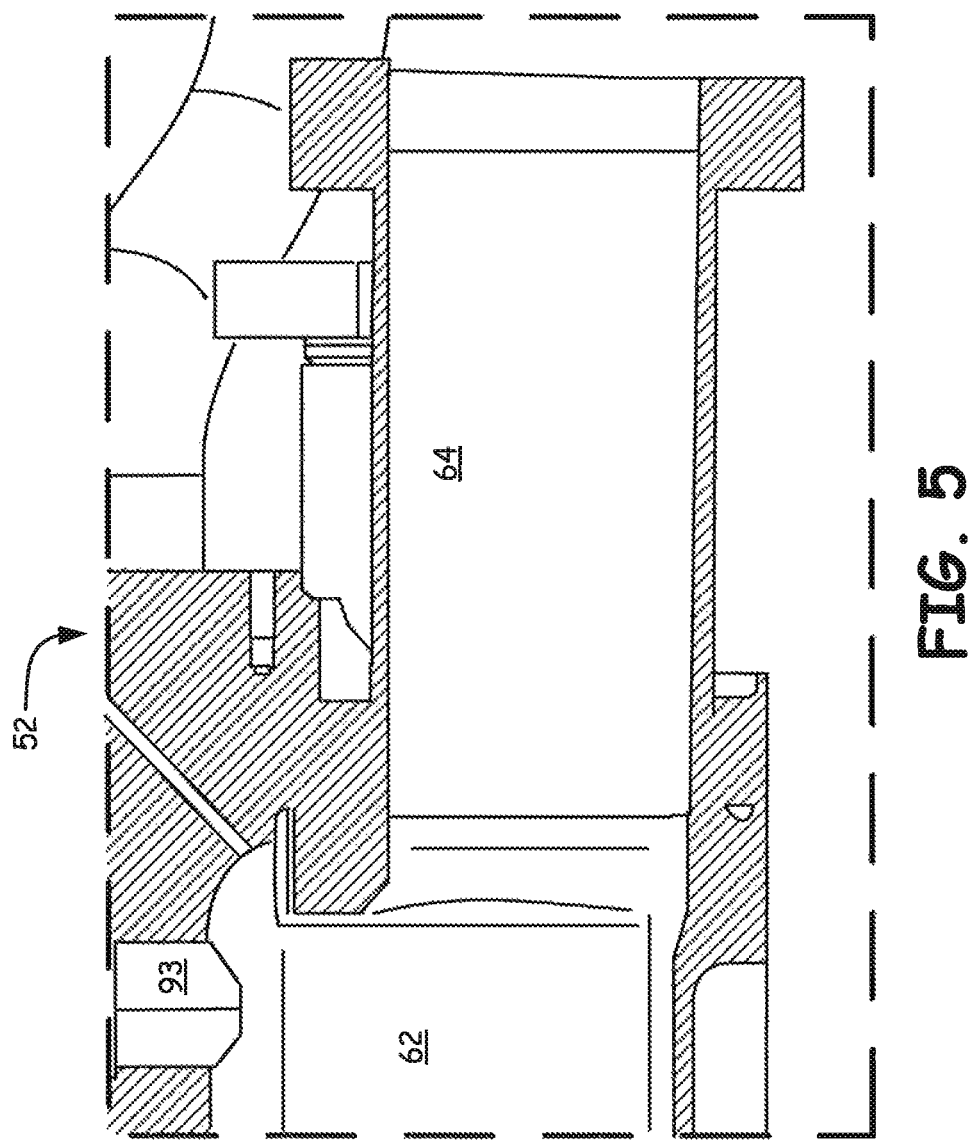

LOW LOSS BEARING DRAIN

BACKGROUND

The described subject matter relates generally to turbine engines and more specifically to lubrication of bearings for turbine engines.

Industrial gas turbine engines, and other turbine engines utilize one or more turbine modules such as a power turbine for generating and transferring motive power to industrial equipment (e.g., electrical generator, pumps, etc.). Shaft bearings and other turbine bearings require high oil flow rates for lubrication and cooling.

After being supplied to the bearings, used lubricant is flung outward to an inner wall of the bearing housing, where it is collected and recirculated through the oil system. The lubricant must be evacuated from the base of the bearing housing in a timely manner, or else flooding of the bearings as well as churning and foaming of stagnant lubricant can occur. Sharp directional changes and narrow passageways around the base of the bearing housing can reduce momentum of the used lubricant, causing it to collect at the base of the bearing housing. Further, pumps can create negative pressure in the bearing compartment and increase parasitic losses.

SUMMARY

A turbine module comprises a turbine shaft, a rotor assembly secured to the shaft, a bearing assembly rotatably supporting the turbine shaft, and a bearing housing containing the bearing assembly. The bearing housing includes a gutter at least partially circumscribing the bearing assembly, and a drain disposed proximate a base of the gutter. The gutter includes a first sloped floor portion circumferentially adjacent to the drain.

A turbomachine bearing system comprises a bearing housing adapted to be in communication with a lubricant supply passage, a drain disposed at a base of the bearing housing, and a gutter in communication with the drain. The gutter at least partially circumscribes the at least one portion of the bearing housing. The gutter includes a floor with at least one sloped portion in communication with, and circumferentially adjacent to the drain.

BRIEF DESCRIPTION OF THE DRAWINGS

FIG. 5 is a lubricant exit duct in communication with the low loss drain.

DETAILED DESCRIPTION

Figure 1:
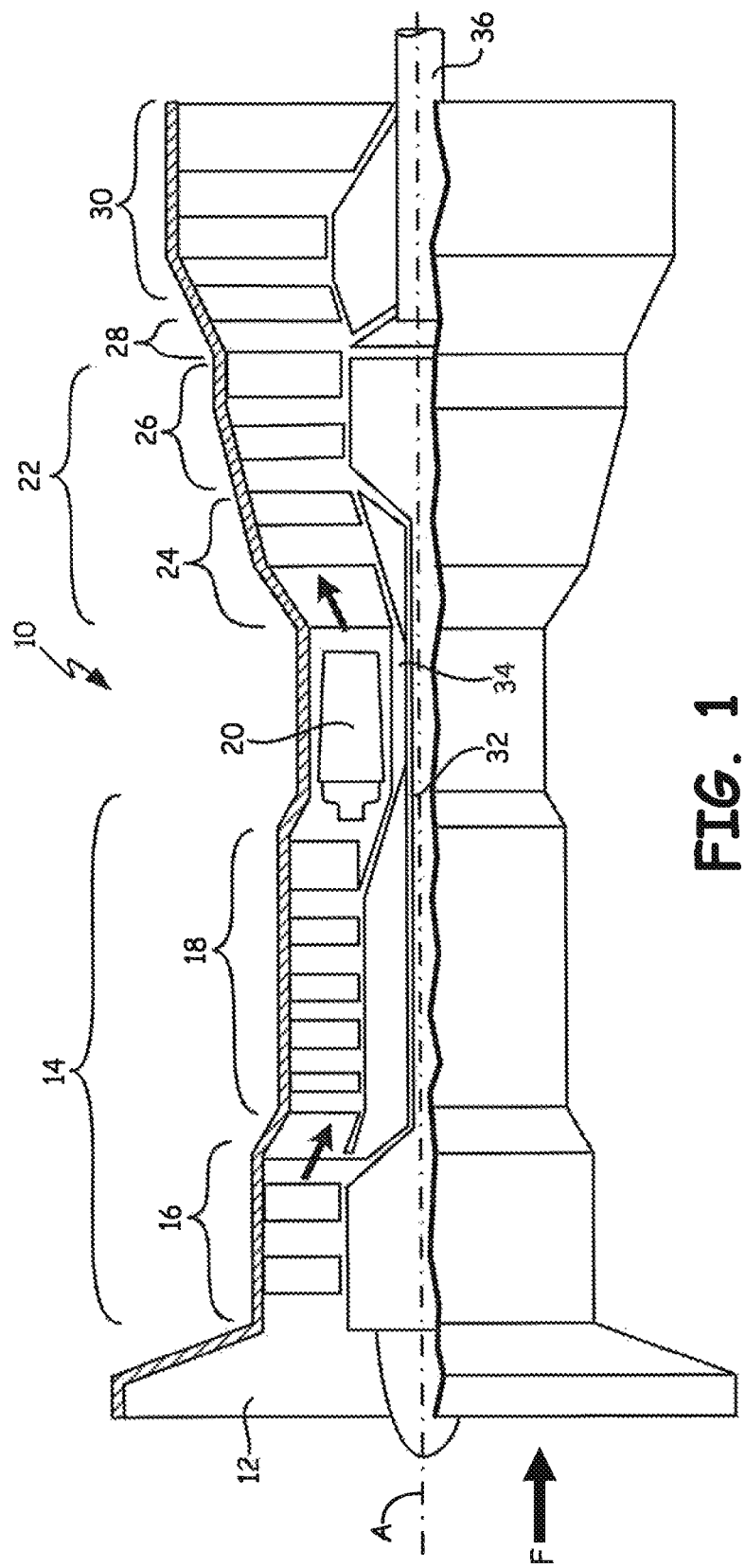
FIG. 1 depicts an example industrial gas turbine engine.

FIG. 1 is a simplified partial cross-sectional view of gas turbine engine 10, comprising inlet 12, compressor 14 (with low pressure compressor 16 and high pressure compressor 18), combustor 20, engine turbine 22 (with high pressure turbine 24 and low pressure turbine 26), turbine exhaust case 28, power turbine 30, low pressure shaft 32, high pressure shaft 34, and power shaft 36. Gas turbine engine 10 can, for instance, be an industrial power turbine.

Low pressure shaft 32, high pressure shaft 34, and power shaft 36 are situated along rotational axis A. In the depicted embodiment, low pressure shaft 32 and high pressure shaft 34 are arranged concentrically, while power shaft 36 is disposed axially aft of low pressure shaft 32 and high pressure shaft 34. Low pressure shaft 32 defines a low pressure spool including low pressure compressor 16 and low pressure turbine 26. High pressure shaft 34 analogously defines a high pressure spool including high pressure compressor 18 and high pressure turbine 24. As is well known in the art of gas turbines, airflow F is received at inlet 12, then is pressurized by low pressure compressor 16 and high pressure compressor 18. Fuel is injected at combustor 20, where the resulting fuel-air mixture is ignited. Expanding combustion gasses rotate high pressure turbine 24 and low pressure turbine 26, thereby driving high and low pressure compressors 18 and 16 through high pressure shaft 34 and low pressure shaft 32, respectively. Although compressor 14 and engine turbine 22 are depicted as two-spool components with high and low sections on separate shafts, single spool or 3+ spool embodiments of compressor 14 and engine turbine 22 are also possible. Turbine exhaust case 28 carries airflow from low pressure turbine 26 to power turbine 30, where this airflow drives power shaft 36. Power shaft 36 can, for instance, drive an electrical generator, pump, mechanical gearbox, or other accessory (not shown).

Figure 2:
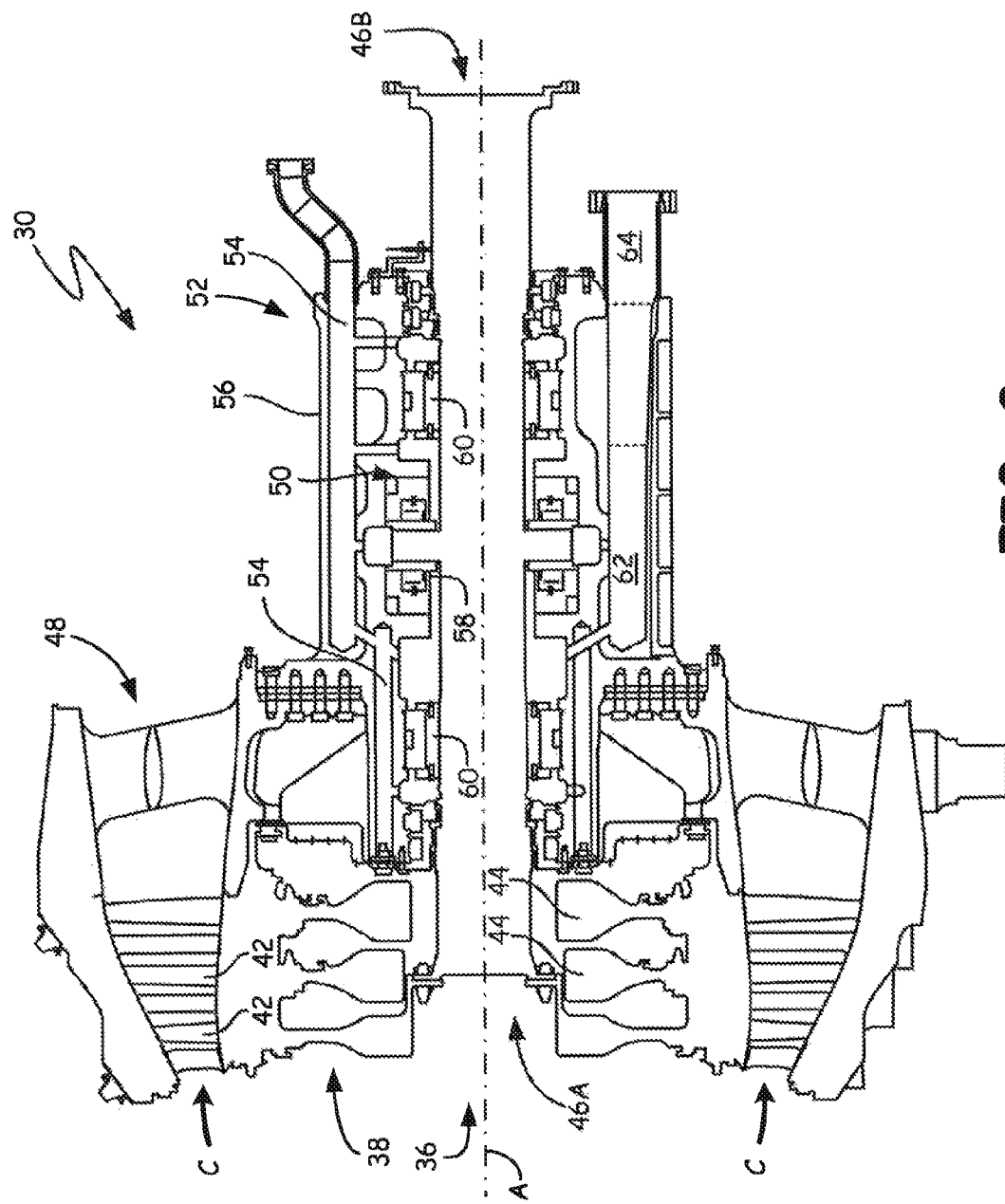
FIG. 2 shows a detailed cross-section of a power turbine section.

FIG. 2 shows a detailed cross-section of power turbine module 30 and also includes turbine shaft 36, rotor assembly 38, airfoils 42, rotor disks 44, shaft forward end 46A, shaft aft end 46B, power turbine exhaust case (PTEC) 48, bearing housing 50, bearing compartment 52, fluid supply passages 54, bearing compartment wall 56, main bearing assembly 58, secondary bearing assemblies 60, exit duct 62, and return line 64.

The turbine module shown in FIG. 2 is described with reference to an example power turbine module such as power turbine module 30 of the example industrial gas turbine engine 10 shown in FIG. 1. However, it will be appreciated that various embodiments of a turbine module and its associated components can be adapted to other turbine sections of gas turbine engine 10, such as high pressure turbine 24 and low pressure turbine 26. Additionally or alternatively, embodiments of a turbine module and associated components can be adapted to turbine sections of other gas and steam turbine engines.

In FIG. 2, the example power turbine module 30 includes turbine shaft 36 rotatable about center line, or axis A. Rotor assembly 38 is secured to power turbine shaft 36. In this example, rotor assembly 38 includes several rotor stages each including a plurality of airfoils 42 circumferentially distributed around each rotor disk 44. Working gas C is directed through power turbine module 30 to rotate each rotor stage, which drives power turbine shaft 36 from shaft forward end 46A. Working gas C is exhausted out from power turbine exhaust case (PTEC) 48. One or more pieces of industrial equipment such as an electrical generator or mechanical pump (not shown) can be secured to shaft aft end 46B to be driven by power turbine module 30.

Figure 3:
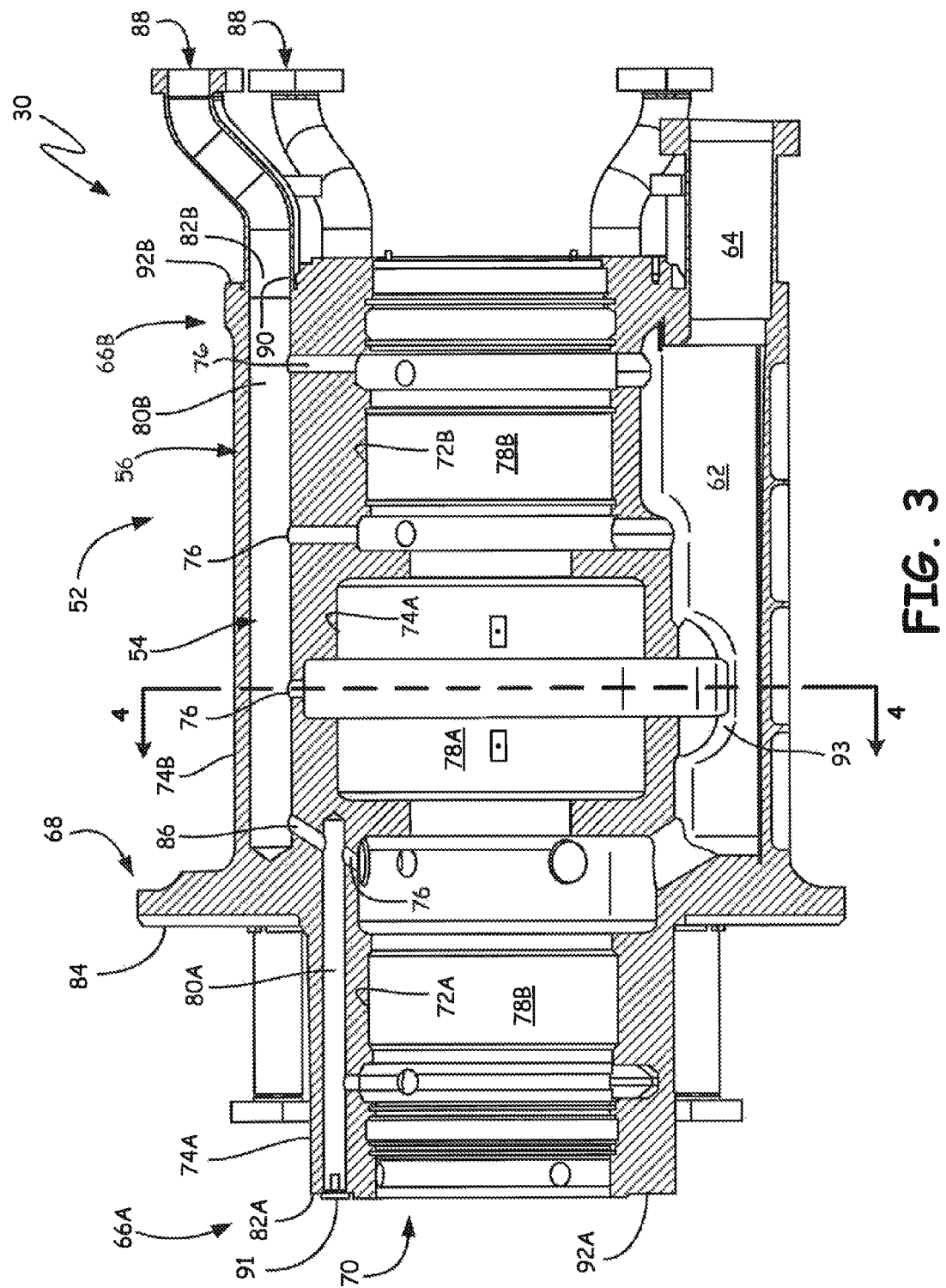
FIG. 3 is a detailed sectional view of a power turbine bearing compartment.
Figure 4:
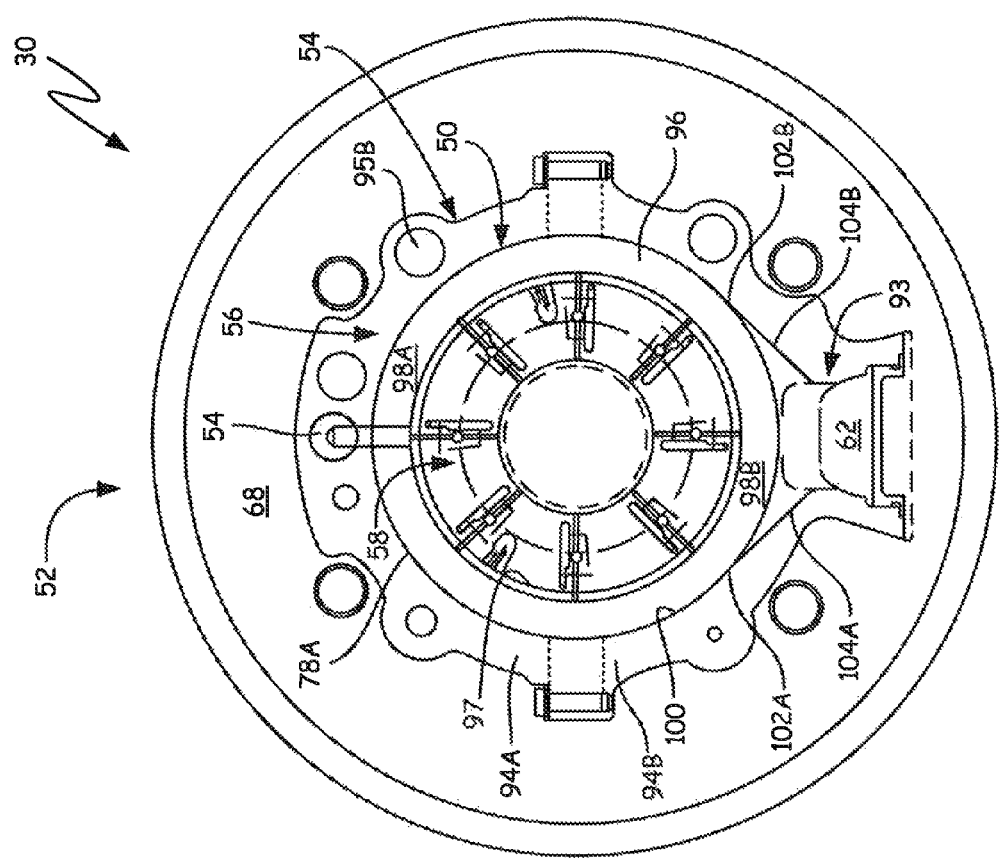
FIG. 4 shows a forward facing radial cross-section of the power turbine bearing compartment housing including a low loss drain.

FIG. 2 also shows bearing housing 50 secured in bearing compartment 52. Power turbine shaft 36 is rotatably supported aft of rotor assembly 38 by one or more power turbine bearing assemblies retained in bearing housing 50. In the example shown, one or more fluid supply passages 54 can be in fluid communication with one or more axially spaced apart bearing assemblies disposed within bearing housing 50. Main bearing assembly 58 and secondary bearing assemblies 60 are axially spaced apart along the length of bearing compartment 58. Lubricant is communicated from fluid supply passages 54 to each bearing assembly 58, 60. Used lubricant is flung outward by the bearings toward bearing housing 50, where it is collected and drained as shown in FIGS. 3 and 4. Oil can then be returned to the engine oil system through exit duct 62 and return line 64.

In the example of FIG. 2, fluid supply passages 54 are incorporated into various portions of bearing compartment outer wall 56. (See commonly assigned U.S. patent application Ser. No. 14/785,094entitled "Bearing Compartment with Integrated Fluid Supply Lines, filed on an even date herewith). However, some or all of these fluid passages, including one or more lubricant supply passages can be externally mounted to outer wall 56.

FIG. 3 shows a more detailed view of an example bearing system for power turbine module 30. FIG. 3 also includes exit duct 62, return line 64, forward wall section 66A, aft wall section 66B, transition wall section 68, shaft passage 70, forward bearing compartment inner surface 72A, aft bearing compartment inner surface 72B, forward bearing compartment outer wall surface 74A, aft bearing compartment outer wall surface 74B, lubricant supply outlets 76, main bearing housing portion 78A, secondary bearing housing portions 78B, forward integral fluid passage segment 80A, aft integral fluid passage segment 80B, passage inlets 82A, 82B, mounting surface 84, transition passage 86, supply pipes 88, fitting 90, plug 91, bearing compartment end walls 92A, 92B, and drain 93. Power turbine shaft 36 (shown in FIG. 2) is omitted for clarity.

In this example, bearing compartment wall 56 includes forward wall section 66A and aft wall section 66B connected by transition wall section 68. Wall 56 can additionally or alternatively be divided into upper and lower halves (shown in FIG. 4) so that each half of bearing compartment outer wall 56 can be sand cast into a general U-shape or crescent shape. This defines the rough shape of shaft passage 70. Each half can be further machined so that bearing housing(s) 50 generally conform to forward bearing compartment inner surface 72A, and aft bearing compartment inner surface 72B. Forward wall section 66A can be defined relative to forward inner wall surface 72A and forward outer wall surface 74A. Aft wall section 66B can be similarly defined relative to aft inner wall surface 72B and aft outer wall surface 74B.

Fluid supply passages 54 provide lubricant to main bearing assembly 58 and secondary bearing assemblies 60 (shown in FIG. 2) via one or more lubricant supply outlets 76 in communication with bearing housing(s) 50. In this example, axially spaced apart supply outlets 76 are disposed axially along an upper half of bearing housing 50 proximate main bearing housing portion 78A and secondary bearing housing portions 78B. In use, lubricant can be received into one or both passage segments 80A, 80B via forward passage inlet 82A and/or aft passage inlet 82B, depending on the configuration of power turbine module 30. Forward and aft passage segments 80A, 80B can be interconnected by transition passage 86 to form a single effective passage 54. To secure the turbine modules to an adjacent module, wall transition section 68 can comprise flange or mounting surface 84 as shown in FIG. 3. In certain embodiments, forward wall section 66A has a smaller nominal diameter than aft wall section 66B to permit interconnection of power turbine module 30 to an adjacent turbine module (e.g., turbine exhaust case 28 and/or low pressure turbine 26 shown in FIG. 1). Though shown with conventional bolt-type fasteners, this interconnection can additionally or alternatively include other modes of securing the two modules such as interference fittings. In alternative embodiments, transition wall section 68 can be stepped or tapered.

In this example, supply pipe 88 is engaged with suitable fluid-tight fitting(s) 90 metallurgically bonded to one or both bearing compartment end wall(s) 92A, 92B. Plug 91 can also be inserted into forward or aft passage inlet 82A, 82B so as to maintain fluid pressure in the single effective passage 54 and prevent leakage. Alternatively, forward and aft passage segments 80A, 80B can operate as separate lubricant passages 54.

Received fluid can be communicated along forward fluid passage segment 80A to one or more of axially spaced apart main bearing assembly 58 and secondary bearing assemblies 60. Corresponding axially spaced apart fluid supply outlet(s) 76 respectively provide fluid communication between fluid passage segment(s) 80A, 80B, and the one or more bearing assemblies 58, 60. In the case of lubricant, used lubricant can collect in drains 93, and exit through duct 62 into return line 64.

Bearing housing 50 can be provided with a low loss configuration to allow used lubricant to flow freely from main bearing housing portion 78A and/or secondary bearing housing portions 78B into gravity fed drain(s) 93 rather than a sump. The low loss shape minimizes sharp directional changes along the walls of bearing housing 50, which can slow the flow rate of used lubricant. Sustained or repeated operation of power turbine module 30 with flooded bearings results in churning and foaming of stagnant lubricant. An example of a low loss configuration is shown in the sectional view of FIG. 4.

FIG. 4 shows an example low loss configuration of bearing housing 50. FIG. 4 is a sectional view taken through main bearing assembly 58 (across line 4-4 of FIG. 3) and viewed toward transition wall section 68. In FIG. 4, bearing compartment wall 56 is divided into upper and lower halves 94A, 94B which may be separately cast and fastened together so that bearing housing 50 can be retained therein.

Lubricant passage 54 is disposed above main bearing assembly 58 to supply fresh lubricant. Gutter 96 can partially or completely circumscribe each bearing assembly (e.g., main bearing assembly 64). One or more gutters 96 can be recessed into inner surface 97 of main bearing housing portion 78A, which collects and passes the used lubricant toward drain 93 and into exit duct 62 and return line 64 (shown in FIG. 3). Additionally or alternatively gutter(s) 96 can be provided for secondary bearing assemblies 60 (shown in FIGS. 2 and 3).

For ease of description, gutter 96 can be notionally divided into base 98A and upper portion 98B. In gutter base 98A, gutter floor 100 is sloped on one or both sides of drain 93. Gutter floor 100 may be sloped toward drain 93 from respective clockwise and counterclockwise angular locations 102A, 102B to maintain downward momentum of draining lubricant as it approaches and enters drain 93. In certain embodiments, first floor slope 104A is tangential to the remainder of floor 100 at clockwise angular location 102A, Similarly, second floor slope 104B can be tangential to the remainder of floor 100 at counterclockwise angular location 102B.

In certain embodiments, upper floor portion 98B can include a generally circular profile. In other words, gutter 96 can have a substantially constant depth except on either circumferential side of drain 93. Since first and second floor slopes 104A, 104B can be tangential to the remainder of gutter floor 100, the angle of one or both floor slopes 104A, 104B can be substantially equal to the circumferential spacing of respective angular locations 102A, 102B from BDC.

For example, in certain embodiments, first floor slope 104A is tangential to the remainder of gutter floor 100 at clockwise angular location 102A, and clockwise angular location 102A is spaced between about 40° and about 50° from BDC of gutter 96. In these embodiments, first floor slope 104A also provides a flow surface with an angle between about 40° and about 50°. In this way, lubricant can then be removed from bearing housing 50 through the open drain passage faster than the lubricant can accumulate in gutter 96.

FIG. 5 shows exit duct 62 and return line 64. Drain(s) 93, adapted to evacuate oil from around each bearing assembly, lead to exit duct 62 which runs generally along the base of bearing compartment 52. The exit passage can comprise an open pathway between each drain and the exit port to facilitate removal of used oil. This can be done without the need to utilize a scavenge pump or other sump.

As noted above, power turbine module 30 is one example turbine module for a large-scale gas turbine engine. Many such ground-based engines have a large nominal diameter to operate large-scale electrical machines or transport pumps. In certain embodiments, the entirety of the forward and/or aft wall sections each have a cross-sectional outer diameter measuring more than about 1.0 m (about 39 inches). In combination with the low-loss drain configuration, there is no need for a scavenge pump despite large lubricant flow rate capacities of about 3.8 L/sec (60 gal/min) through one or more of the bearing assemblies. In certain embodiments, the flow rates can exceed 5.0 L/sec (80 gal/min) through each bearing assembly without flooding the bearings.

Discussion of Possible Embodiments

The following are non-exclusive descriptions of possible embodiments of the present invention:

A turbine module comprises a turbine shaft, a rotor assembly secured to the shaft, a bearing assembly rotatably supporting the turbine shaft, and a bearing housing containing the bearing assembly. The bearing housing includes a gutter at least partially circumscribing the bearing assembly, and a drain disposed proximate a base of the gutter. The gutter includes a first sloped floor portion circumferentially adjacent to the drain.

The apparatus of the preceding paragraph can optionally include, additionally and/or alternatively, any one or more of the following features, configurations and/or additional components:

A further embodiment of the foregoing turbine module, wherein the first sloped floor portion is tangential to an upper floor portion at a clockwise or counterclockwise angular location relative to a center of the drain.

A further embodiment of any of the foregoing turbine modules, wherein the gutter also includes a second sloped floor portion circumferentially adjacent to the drain.

A further embodiment of any of the foregoing turbine modules, wherein the second sloped floor portion is tangential to the upper floor portion at an opposite angular location from the first sloped floor portion with respect to the center of the drain.

A further embodiment of any of the foregoing turbine modules, wherein the upper floor portion is generally circular and circumscribes the bearing assembly between the clockwise angular location and the counterclockwise angular location.

A further embodiment of any of the foregoing turbine modules, wherein at least one of the clockwise angular location and the counterclockwise angular location is spaced more than 40°, and less than about 50°, from the center of the drain.

A further embodiment of any of the foregoing turbine modules, further comprising a plurality of bearing assemblies contained in the bearing housing, each of the plurality of bearing assemblies including a plurality of bearings rotatably supporting the turbine shaft. A plurality of gutters are recessed into the bearing housing inner surface, each of the plurality of gutters at least partially circumscribing corresponding ones of the plurality of bearing assemblies, each gutter including a first sloped floor portion circumferentially adjacent to a drain disposed proximate a base of each gutter.

A further embodiment of any of the foregoing turbine modules, further comprising a bearing compartment including a longitudinal exit passage in communication with the drain.

A further embodiment of any of the foregoing turbine modules, wherein the exit passage comprises an open pathway between the drain and a lubricant return line.

A further embodiment of any of the foregoing turbine modules, wherein an outer diameter of the bearing housing proximate the bearing assembly measures at least about 1.0 m (39 inches).

A further embodiment of any of the foregoing turbine modules, wherein a lubricant flow rate capacity of the bearing assembly is at least about 3.8 liters/second (about 1.0 gal/second).

A turbomachine bearing system comprises a bearing housing adapted to be in communication with a lubricant supply passage, a drain disposed at a base of the bearing housing, and a gutter in communication with the drain. The gutter at least partially circumscribes the at least one portion of the bearing housing. The gutter includes a floor with at least one sloped portion in communication with, and circumferentially adjacent to the drain.

The apparatus of the preceding paragraph can optionally include, additionally and/or alternatively, any one or more of the following features, configurations and/or additional components:

A further embodiment of the foregoing turbomachine bearing system, wherein the gutter includes a first sloped floor portion extending between the drain and a first angular location of the gutter relative to a center of the drain.

A further embodiment of any of the foregoing turbomachine bearing systems, wherein the gutter also includes a second sloped floor portion extending between the drain and a second angular location of the gutter relative to the center of the drain.

A further embodiment of any of the foregoing turbomachine bearing systems, wherein the first floor portion and the second sloped floor portion are each tangential to an upper floor portion of the gutter.

A further embodiment of any of the foregoing turbomachine bearing systems, wherein the upper floor portion is generally circular and circumscribes the at least one portion of the bearing housing between the first angular location and the second angular location. A further embodiment of any of the foregoing turbomachine bearing systems, wherein at least one of the first angular location and the second angular location is spaced more than 40°, and less than about 50°, from the center of the drain.

A further embodiment of any of the foregoing turbomachine bearing systems, further comprising a plurality of bearing assemblies contained in the bearing housing, and a plurality of gutters at least partially circumscribing corresponding ones of the plurality of bearing assemblies, each gutter including a first sloped floor portion circumferentially adjacent to a corresponding plurality of drains disposed proximate a base of each gutter.

A further embodiment of any of the foregoing turbomachine bearing systems, further comprising a longitudinal exit duct in communication with one or more of the plurality of drains.

A further embodiment of any of the foregoing turbomachine bearing systems, wherein the exit passage comprises an open pathway between the one or more drains and a lubricant return line.

Although the present invention has been described with reference to preferred embodiments, workers skilled in the art will recognize that changes may be made in form and detail without departing from the spirit and scope of the invention.

The invention claimed is:

1. A turbine module comprising:
   a turbine shaft rotatable about a center line of the turbine module;
   a rotor assembly secured to the turbine shaft, the rotor assembly including a plurality of airfoils circumferentially distributed around a rotor disk;
   a first bearing assembly including a first plurality of bearings rotatably supporting the turbine shaft;
   a bearing housing containing the first bearing assembly, the bearing housing including a first gutter recessed into an inner surface of the bearing housing, and at least partially circumscribing the first plurality of bearings radially outward therefrom, and a drain disposed proximate a base of the gutter, the first gutter including a first sloped floor portion circumferentially adjacent to the drain; and
   a bearing compartment retaining the bearing housing, the bearing compartment including a longitudinal exit duct in communication with the drain;
   wherein the exit duct comprises an open longitudinal pathway between the drain and a lubricant return line disposed at an axial end of the turbine module.

2. The turbine module of claim 1, wherein the first sloped floor portion is tangential to an upper floor portion at a clockwise or counterclockwise angular location relative to a center of the drain.

3. The turbine module of claim 2, wherein the first gutter also includes a second sloped floor portion circumferentially adjacent to the drain.

4. The turbine module of claim 3, wherein the second sloped floor portion is tangential to the upper floor portion at an opposite angular location from the first sloped floor portion with respect to the center of the drain.

5. The turbine module of claim 2, wherein the upper floor portion is generally circular and circumscribes the first bearing assembly between the clockwise angular location and the counterclockwise angular location.

6. The turbine module of claim 2, wherein at least one of the clockwise angular location and the counterclockwise angular location is spaced more than 40°, and less than about 50°, from the center of the drain.

7. The turbine module of claim 1, further comprising:
   a plurality of bearing assemblies, including the first bearing assembly contained in the bearing housing, each of the plurality of bearing assemblies including a plurality of bearings, including the first plurality of bearings rotatably supporting the turbine shaft; and
   a plurality of gutters, including the first gutter, recessed into the bearing housing inner surface, each of the plurality of gutters at least partially circumscribing corresponding ones of the plurality of bearing assemblies and each gutter including a first sloped floor portion circumferentially adjacent to a drain disposed proximate a base of each gutter.

8. The turbine module of claim 1, wherein an outer diameter of the bearing housing proximate the first bearing assembly measures at least about 1.0 m (39 inches).

9. The turbine module of claim 8, wherein a lubricant flow rate capacity of the first bearing assembly is at least about 3.8 liters/second (about 1.0 gal/second).

10. A turbomachine bearing system comprising:
    a bearing housing including at least one portion adapted to be in communication with a lubricant supply passage;
    a drain disposed at a base of the bearing housing;
    a first gutter in communication with the drain, recessed into an inner surface of the bearing housing, and at least partially circumscribing the at least one portion of the bearing housing, the gutter including a floor with at least one sloped portion in communication with, and circumferentially adjacent to the drain; and
    a bearing compartment retaining the bearing housing, the bearing compartment including a longitudinal exit duct in communication with the drain;
    wherein the exit duct comprises an open longitudinal pathway between the drain and a lubricant return line disposed below the bearing housing.

11. The turbomachine bearing system of claim 10, wherein the first gutter includes a first sloped floor portion extending between the drain and a first angular location of the gutter relative to a center of the drain.

12. The turbomachine bearing system of claim 11, wherein the first gutter also includes a second sloped floor portion extending between the drain and a second angular location of the gutter relative to the center of the drain.

13. The turbomachine bearing system of claim 12, wherein the first sloped floor portion and the second sloped floor portion are each tangential to an upper floor portion of the first gutter.

14. The turbomachine bearing system of claim 13, wherein the upper floor portion is generally circular and circumscribes the at least one portion of the bearing housing between the first angular location and the second angular location.

15. The turbomachine bearing system of claim 12, wherein at least one of the first angular location and the second angular location is spaced more than 40°, and less than about 50°, from the center of the drain.

16. The turbomachine bearing system of claim 10, further comprising:
    a plurality of bearing assemblies contained in the bearing housing; and
    a plurality of gutters at least partially circumscribing corresponding ones of the plurality of bearing assemblies, and each gutter including a first sloped floor portion circumferentially adjacent to a corresponding plurality of drains disposed proximate a base of each gutter.

* * * * *